P. J. FORBES.
REEL GUIDE AND STRAP HOLDER.
APPLICATION FILED JAN. 16, 1915.
1,144,831.
Patented June 29, 1915.
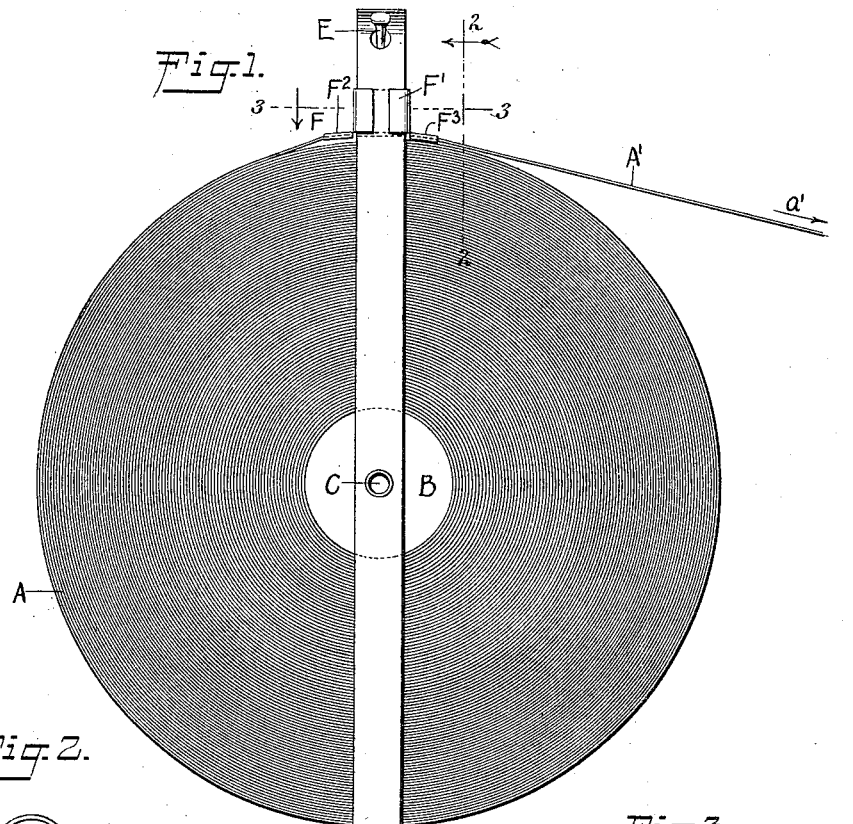
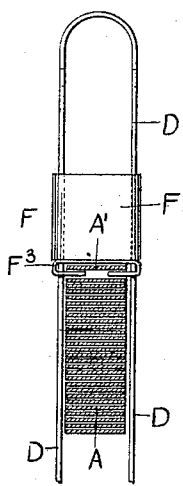
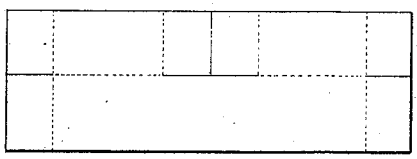
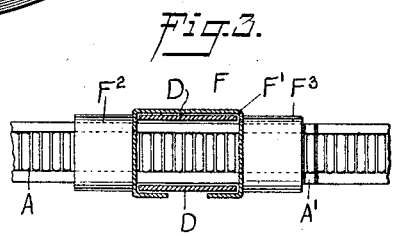
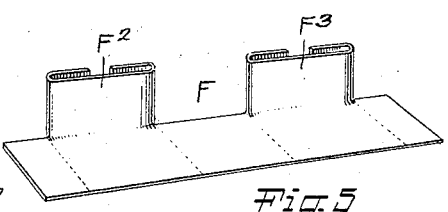
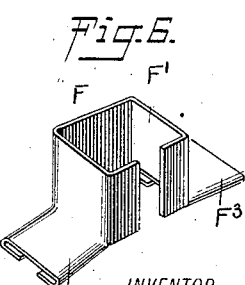
WITNESSES
INVENTOR
Philip J. Forbes
BY
ATTORNEYS
THE NORRIS PETERS CO., PHOTO-LITHO., WASHINGTON, D. C.

UNITED STATES PATENT OFFICE.

PHILIP JONES FORBES, OF NEW YORK, N. Y.

REEL-GUIDE AND STRAP-HOLDER.

1,144,831.　　　　　Specification of Letters Patent.　　Patented June 29, 1915.

Application filed January 16, 1915. Serial No. 2,652.

*To all whom it may concern:*

Be it known that I, PHILIP J. FORBES, a citizen of the United States, and a resident of the city of New York, borough of Brooklyn, in the county of Kings and State of New York, have invented a new and Improved Reel-Guide and Strap-Holder, of which the following is a full, clear, and exact description.

The object of the invention is to provide a new and improved reel guide and holder, more especially designed for use on a reel carrying a box strap roll, and arranged to insure an easy unreeling of the box strap in length as needed by the operator employed for putting the strap around the box and to hold the roll from opening up after the desired length is cut off.

In order to accomplish the desired result use is made of a tubular body mounted to slide on the reel frame and provided at the sides with guideways for the passage of the box strap to guide the latter when reeled off, to cause the guard to slide on the reel frame and to hold the convolutions of the roll against opening after a desired length of strap has been unwound and cut off.

A practical embodiment of the invention is represented in the accompanying drawings forming a part of this specification, in which similar characters of reference indicate corresponding parts in all the views.

Figure 1 is a side elevation of a reel guide and strap holder as applied; Fig. 2 is an enlarged cross section of the same on the line 2—2 of Fig. 1; Fig. 3 is an enlarged sectional plan view of the same on the line 3—3 of Fig. 1; Fig. 4 is a plan view of the blank for forming the reel guide and strap holder; Fig. 5 is a perspective view of the partly finished guide and holder; and Fig. 6 is a perspective view of the guard and holder.

The box strap to be guided and held by the device hereinafter more fully explained is in the form of a roll A having its inner end secured in any suitable manner to a drum B mounted to turn on a stud C attached to a reel frame D adapted to be hung on a nail or other support E within convenient reach of the operator using the box strap on a box to reinforce the same. The reel frame D is preferably made from a piece of strap iron bent to form two bars between which extends the reel A and the drum B and on the bars is mounted to slide a reel guide and holder F having a tubular body F' slidingly engaging the bars so as to slide inwardly thereon as the roll A diminishes. The body F' is provided at the inner or lower edges of its sides with guideways $F^2$, $F^3$ extending outwardly in opposite directions, and through the said guideways is adapted to pass the end A' of the box strap roll A. By reference to Figs. 1 and 6, it will be noticed that the guideways $F^2$, $F^3$ are slightly bent toward the peripheral face of the roll A to allow the end A' of the box strap to readily pass through the guideways $F^2$ and $F^3$ on the operator exerting a pull on the end A' in the direction of the arrow $a'$. The guide and holder F is preferably made from a single piece of sheet metal cut and bent to form the body F' and the guideways $F^2$, $F^3$, as will be readily understood by reference to Figs. 4 and 5. It will be noticed that by the arrangement described the body F' can be readily slipped onto the upper end of the reel frame D and then the end of the box strap roll A can be threaded through the guideways $F^2$, $F^3$ so as to guide the said end when unwinding the box strap in length as needed by the operator employed for putting the strap around the box. It is understood that after this has been done the operator cuts off the unwound end of the strap. It will be noticed that when the box strap is unwound the guide and holder F is caused to slide inward on the frame D so that the guideways $F^2$ and $F^3$ are at all times close to the peripheral face of the roll A and hence the box strap is not liable to kink. After the desired length of the unwound box strap is cut off the inherent resiliency of the box strap exerts a tilting pressure on the guideways $F^2$, $F^3$ so that the body F' is held against outward movement by frictional contact of the body on the frame D and hence the convolutions of the roll A are not liable to open up.

The reel guide and strap holder is very simple in construction and can be readily applied to the frame of a box strap reel as now generally constructed.

Having thus described my invention, I claim as new and desire to secure by Letters Patent:

1. A guide and holder comprising a tubular body adapted to slide radially on the frame of a box strap reel, and guideways for the passage of the box strap and projecting outwardly in opposite directions from the inner ends of the said body to slide the said body radially inward on the reel frame on unwinding the box strap and to hold the convolutions of the box strap roll from opening up.

2. A guide and holder for box strap reels made of a single piece of metal shaped to form a tubular body adapted to slide radially on the frame of the reel, and flat guideways integral with the inner edges of the sides of the said body and extending sidewise in opposite directions in the plane of the box strap roll.

In testimony whereof I have signed my name to this specification in the presence of two subscribing witnesses.

PHILIP JONES FORBES.

Witnesses:
THEO. G. HOSTER,
PHILIP D. ROLLHAUS.

Copies of this patent may be obtained for five cents each, by addressing the "Commissioner of Patents, Washington, D. C."